Oct. 10, 1961
V. G. SHARPE
3,003,336
ICE TRAY GRID
Filed May 19, 1959
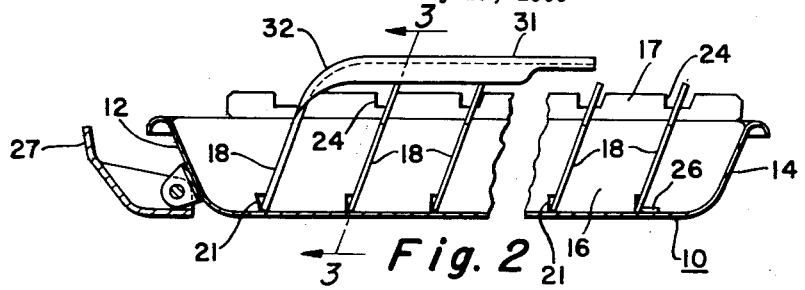
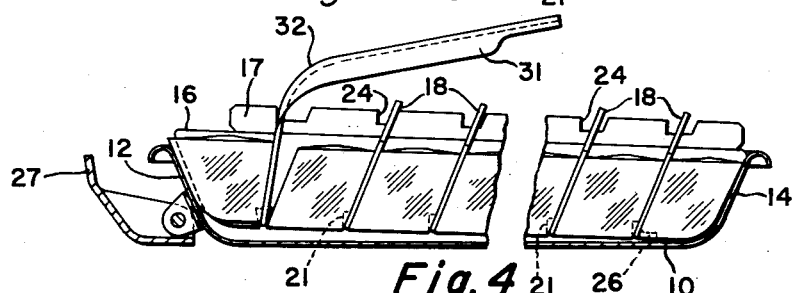
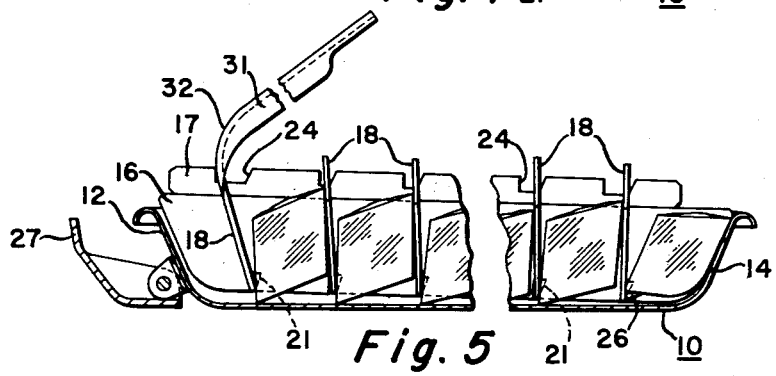
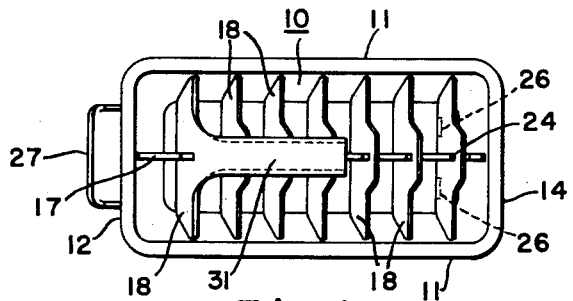
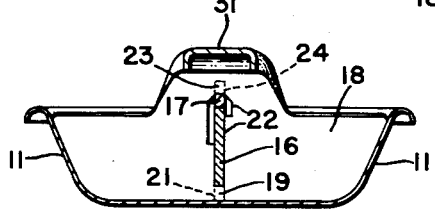
INVENTOR.
Verlos G. Sharpe
BY
His Attorney

United States Patent Office 3,003,336
Patented Oct. 10, 1961

3,003,336
ICE TRAY GRID
Verlos G. Sharpe, Xenia, Ohio, assignor to General Motors Corporation, Detroit, Mich., a corporation of Delaware
Filed May 19, 1959, Ser. No. 814,212
2 Claims. (Cl. 62—367)

This invention relates to a freezing device of the tray and grid type and particularly to means on a unitary grid structure for effecting release of ice blocks from the device.

It has heretofore been the practice to provide a force multiplying leverage mechanism on a grid structure of an ice block forming or freezing device, the lever of which mechanism was fabricated as a separate part of the grid structure independent of walls thereof thus necessitating an individual pivot pin or shaft mounting for the lever or additional link and pin connections of the lever with a grid wall actuating element for operating the grid to release ice blocks from a tray in which the grid is disposed and from walls of the grid structure. This multiplies parts of a grid structure, increases its manufacturing costs, complicates assembly of the grid, and such additional mounting means for a lever on a grid creates a point in the construction thereof which is likely to cause trouble resulting in service calls for repair or replacement of the grids. I contemplate the construction of a simplified and less expensive unitary grid structure for disposition in a freezing tray and the provision on the grid in a new and novel manner of a member or lever for operating same to tilt walls thereof for releasing ice blocks from the tray and grid.

The primary object of my invention is to provide an improvement in a unitary movable walled grid structure for disposition in a freezing tray adapted to contain water to be frozen into separated ice blocks.

Another object of my invention is to provide a unitary grid structure for an ice tray with a unique low cost member thereon for operating the grid in an ice block harvesting operation.

Still another and more specific object of my invention is to provide on a unitary grid structure an operating lever or member formed integral with a transverse wall of the grid and movable or rotatable therewith about the pivotal interlock of this wall to a longitudinal partition of the grid so as to eliminate fabrication of a separate lever or member and the extra pivotal mounting of such independent lever upon a grid or linkage connections thereof to a shiftable part in the grid structure.

Further objects and advantages of the present invention will be apparent from the following description, reference being had to the accompanying drawings wherein a preferred embodiment of the present invention is clearly shown.

In the drawings:

FIGURE 1 is a top view of an elongated freezing device including a tray and a unitary grid structure disposed therein having my invention incorporated in the grid;

FIGURE 2 is a broken enlarged view of the freezing device shown in FIGURE 1 with the tray thereof in section showing a grid operating member formed on one of its transverse walls;

FIGURE 3 is a sectional view taken on the line 3—3 of FIGURE 2 showing transverse walls of the grid interlocked with the bottom edge portion of a longitudinal partition thereof for tilting movement relative thereto;

FIGURE 4 is a view similar to FIGURE 2 showing an initial movement of the grid operating member to free ice blocks from the tray of the freezing device; and FIGURE 5 is a view similar to FIGURE 4 showing further or continued movement of the grid operating member to release all the ice blocks from the grid structure.

Referring to the drawings, wherein my invention is illustrated, I show in FIGURE 1 thereof a freezing device for use in a household refrigerator cabinet which is substantially filled with water and placed in a freezing chamber of the cabinet for freezing the water into ice blocks which are, when harvested from the device, employed in chilling salads or the like and drinks in glasses at a dinner table. The freezing device includes an elongated sheet metal pan or tray 10 provided with inclined sides 11 and inclined ends 12 and 14 having a rolled-over top rim. The freezing device also includes a movable-walled unitary grid structure disposed in tray 10 for dividing the interior thereof into rows of ice block forming compartments in which water is to be frozen into separated ice blocks as is conventional in the art. The grid structure comprises a two-part metal longitudinal partitioning means including a lower partition wall 16 and an upper actuating wall or element 17 disposed in vertical alignment therewith and adapted to be shifted or impelled back and forth therealong. A plurality of longitudinally spaced-apart, substantially inflexible metal walls 18 extend continuously and transversely across the longitudinal grid partition and are pivotally mounted or movably interlocked to the bottom edge portion of wall 16 for tilting movement relative thereto. A lower web portion 19 on the transverse grid walls 18 (see FIGURE 3) is fitted in equally spaced-apart, substantially V-shaped notches 21 provided in the bottom edge of partition wall 16. Each cross or transverse wall 18 has an elongated keyhole-shaped opening 22 therein through which partition 16 and element 17 project. An upper web portion 23 of each cross wall 18, above opening 22, is fitted in a notch 24 of a plurality of such notches provided in spaced-apart relation along the length of element 17. The notches 24 are of varying width relative to one another so that one side edge thereof will engage the cross or transverse walls 18 progressively and tilt them one after the other in succession from the front end to the rear end of the freezing device when element 17 is shifted or impelled lengthwise along partition or wall 16. Interlocking of walls 18 in this manner to partition wall 16 and element 17 disposes the transverse walls in an inclined position with respect to the vertical for pivotal tilting movement toward the vertical about the axis of their interlock to partition 16 or within the notches 21. The cross wall of the grid at the rear end 14 of tray 10 is provided with a lower lip 26 which aids in releasing ice blocks at the rear end of the freezing device from the grid. Front end 12 of tray 10 has a handle 27 pivotally mounted thereon for breaking an ice bond between the tray and a freezing or refrigerated support for the freezing device as is also conventional in the art.

In accordance with my invention and in order to operate the grid structure, the one cross wall 18 at the front end 12 of tray 10 has a rigid handle-like extension 31 formed integrally therewith. The extension 31 is substantially U-shaped in cross sectional contour (see FIGURE 3) for increasing its rigidity, and it projects or continues upwardly from the front wall 18 and is bent, as at 32, to lie longitudinally over the central part of the grid structure in a direction away from the front end 12 of tray 10. The U shape of lever extension 31 is continued along its juncture with front wall 18 and is diverged laterally beyond the width of the lever into the top of this wall to increase the structural strength of handle lever 31 thereat. Handle-like extension 31, integral with or on front transverse wall 18, provides a manually actuated member or lever on the unitary grid structure for operating same to shift element 17 lengthwise therealong and tilt the walls 18. The operating member or lever 31 is distinguished from such operating means of prior art devices in that it is integral with a transverse grid wall and movable or rotatable simultaneously with the tilting thereof about the axis of the pivotal interlock of the front wall 18 on partition 16. By these distinguishing features of my invention, I eliminate the fabrication of an operating member or lever that is separate from parts of a grid structure and must be pivotally mounted thereon by pins and linkage or the like connections as has previously been the practice in order to operate the grid. Also the feature of an integral lever on a transverse wall and movable about its axis of rotation or pivotal interlock to a longitudinal partition diminishes force required to be applied to a lever engageable with a transverse grid wall beyond its pivoting point of attachment to a partition of the grid. I thereby avoid the necessity of reinforcing a wall or part of the grid at the point of mounting a lever thereon while at the same time eliminate pivot pins and studs from a grid structure to simplify and reduce its manufacturing cost as well as the assembling operation thereof. Having described the construction of the simplified unitary grid structure herein disclosed, I will now proceed to explain its operation.

After ice blocks have been hard-frozen in the freezing device located in a below 32° F. temperatured chamber of a household refrigerator cabinet, the freezing device is removed from the cabinet and supported on a table or work ledge by a person desiring to harvest ice blocks from the device. One hand of the person is placed upon the rear portion of the freezing device and the integral handle, member or lever 31, is grasped by his or her other hand to apply an upward force thereto. This force moves or rotates lever 31 about the pivotal axis of front wall 18, notch 21, to simultaneously tilt this front wall relative or with respect to wall 16 whereupon the two end ice blocks adjacent thereto will be wedged against the front end 12 of tray 10. Due to the inclination of the tray front wall 12, this wedging action loosens the two end ice blocks from the tray and grid and simultaneously elevates the grid and all other ice blocks bonded thereto relative to the bottom of tray 10 (see FIGURE 4). By virtue of moving or rotating lever 31 about the pivotal axis of interlock of the front transverse wall 18, with which the lever is integrated, tilting of this wall is accomplished with less effort than one would imagine, and therefore, it is advantageous to form the lever as an integer thereof. Continued movement or rotation of member or lever 31 about the pivotal axis of the front grid wall further tilts this wall with respect to wall 16 and causes the reinforced spread out juncture part of lever 31 with front wall 18 to engage the side edge of notch 24 in element 17 to shift or impel it lengthwise along wall 16. The shifting of element 17 causes the one side edge of other of the plurality of notches 24 therein to progressively engage and successively tilt all other of the plurality of transverse grid walls with respect to wall 16 toward the vertical. This breaks ice blocks bonded to the grid walls loose therefrom and enlarges the ice block compartments whereby the loosened ice blocks will slide or fall downwardly from the elevated grid onto the bottom of tray 10 (see FIGURE 5). The two upwardly wedged ice blocks at the front end 12 of tray 10 are detached from the freezing device and then the unitary grid structure is removed from tray 10 and the ice blocks contained therein. The two ice blocks, raised by the lips 26, may, if not immediately desired for use, be removed from the grid structure and relocated in tray 10. Due to the connection of operating member or lever 31, through element 17, with cross walls 18, these walls will all be returned to their inclined position when the member or lever is swung or moved back to its original position as shown in FIGURES 1, 2 and 3 of the drawing.

It should, from the foregoing, be apparent that I have provided an improved, simplified and low cost operating means on a unitary grid structure adapted to be disposed in a tray of a freezing device for use in household refrigerator cabinets.

While the embodiment of the present invention as herein disclosed, constitutes a preferred form, it is to be understood that other forms might be adopted.

What is claimed is as follows:

1. In a grid assembly for disposition in and removal as a unit from a tray adapted to contain water to be frozen into separated ice blocks, said grid assembly being of the type provided with a longitudinal partition, a plurality of spaced apart substantially inflexible walls directed transversely across said partition all pivotally interlocked thereto at the bottom thereof forming therewith and with walls of the tray rows of ice block compartments therein and an element movably connected by said transverse walls to the grid assembly constructed and arranged, upon operating a lever included in the assembly for tilting one of the transverse walls relative to said partition, to be shifted by the tilting movement of said one wall into engagement with other of said plurality of transverse walls for so tilting them, the improvement comprising; providing the lever as an integral inverted substantially U-shaped stamped extension of said one wall projecting upwardly therefrom over the top of said grid, the juncture of said U-shaped extension with said one wall being diverged laterally beyond the width of said lever into the top of the one wall for increasing its structural strength in the vicinity thereof, said element and the pivotal interlock of said transverse walls to said partition serving without the aid of additional means to hold said lever against detachment from said grid assembly so that the lever forms a handle thereon for removing same from a tray, and said handle being rotatable only in an arc about the axis of said interlock of said one wall whereby said juncture part therewith directly engages and shifts said movable element.

2. In a grid assembly for disposition in and removal as a unit from a tray adapted to contain water to be frozen into separated ice blocks, said grid assembly being of the type provided with a longitudinal partition, a plurality of spaced apart substantially inflexible walls directed transversely across said partition all pivotally interlocked thereto at the bottom thereof forming therewith and with walls of the tray rows of ice block compartments therein and an element movably connected by said transverse walls to the grid assembly constructed and arranged, upon operating a lever included in the assembly for tilting one of the transverse walls relative to said partition, to be shifted by the tilting movement of said one wall into engagement with other of said plurality of transverse walls for so tilting them, the improvement comprising; providing the lever as an integral inverted substantially U-shaped stamped extension of said one wall projecting upwardly therefrom over the top of said grid, the juncture of said U-shaped extension with said one wall being diverged laterally beyond the width of said lever into the top of the one wall for increasing its structural strength in the vicinity thereof, said element and the pivotal interlock of said transverse walls to said partition serving without the aid of additional means to hold said lever against detachment from said grid assembly so that the lever forms a handle thereon for removing same from a tray, portions of legs of the U of said handle being cut away at the end of said extension to provide a finger grip thereon for facilitating raising of the lever with respect to said grid, and said handle being rotatable only in an arc about the axis of said interlock of said one wall whereby said juncture part therewith directly engages and shifts said movable element.

References Cited in the file of this patent

UNITED STATES PATENTS

| | | |
|---|---|---|
| 2,486,064 | Sampson | Oct. 25, 1949 |
| 2,633,715 | Foster | Apr. 7, 1953 |
| 2,642,726 | Frei | June 23, 1953 |
| 2,642,727 | Frei | June 23, 1953 |